July 19, 1960
K. D. SCHREYER ET AL
2,945,452
CONVEYOR TROLLEY TRACKWAY
Filed March 20, 1959
2 Sheets-Sheet 1
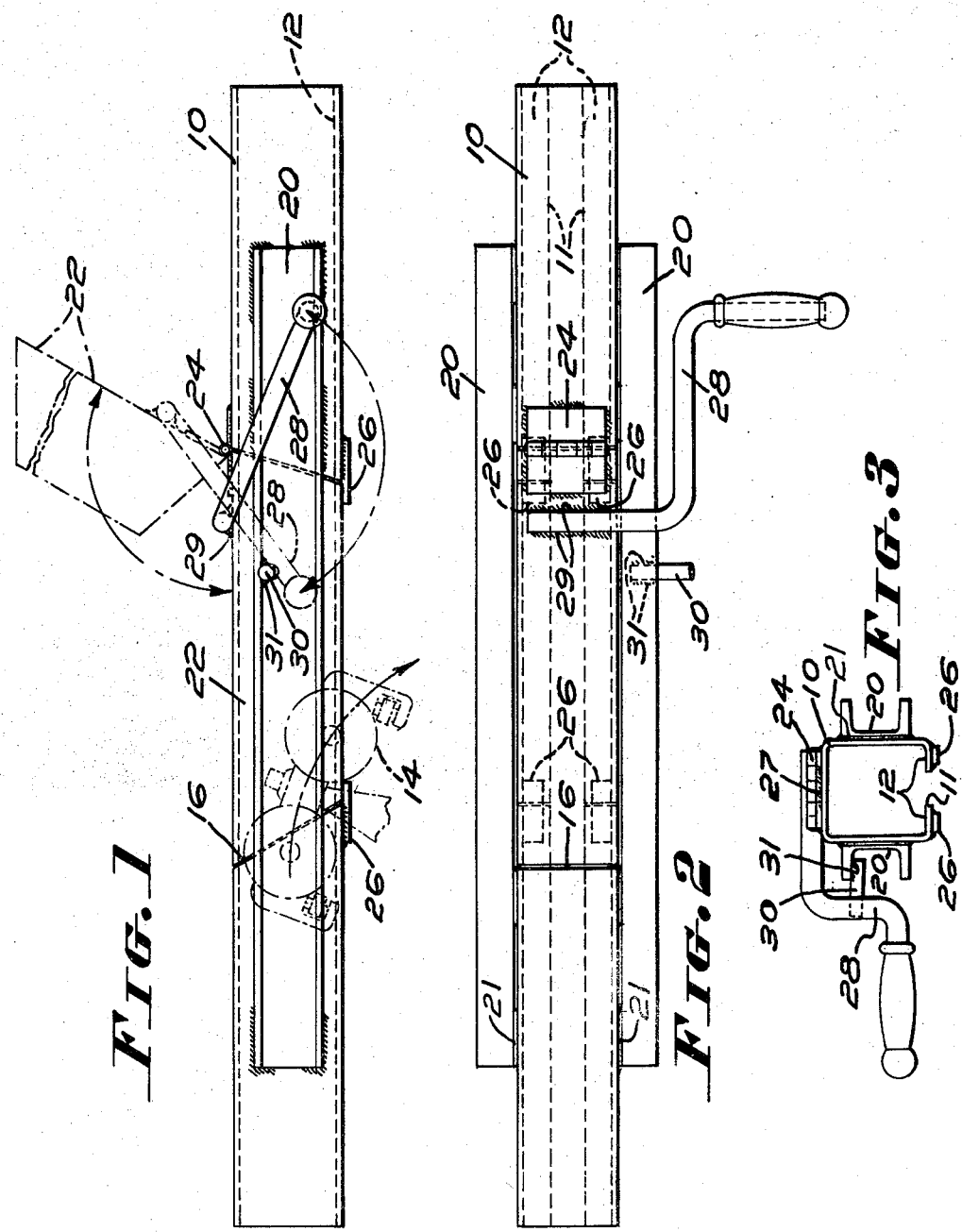
INVENTORS:
KENNETH D. SCHREYER
and ALLAN E. ELDRIDGE
BY: Beau, Brooks, Buckley & Beau,
ATTORNEYS.

July 19, 1960
K. D. SCHREYER ET AL
2,945,452
CONVEYOR TROLLEY TRACKWAY
Filed March 20, 1959
2 Sheets-Sheet 2
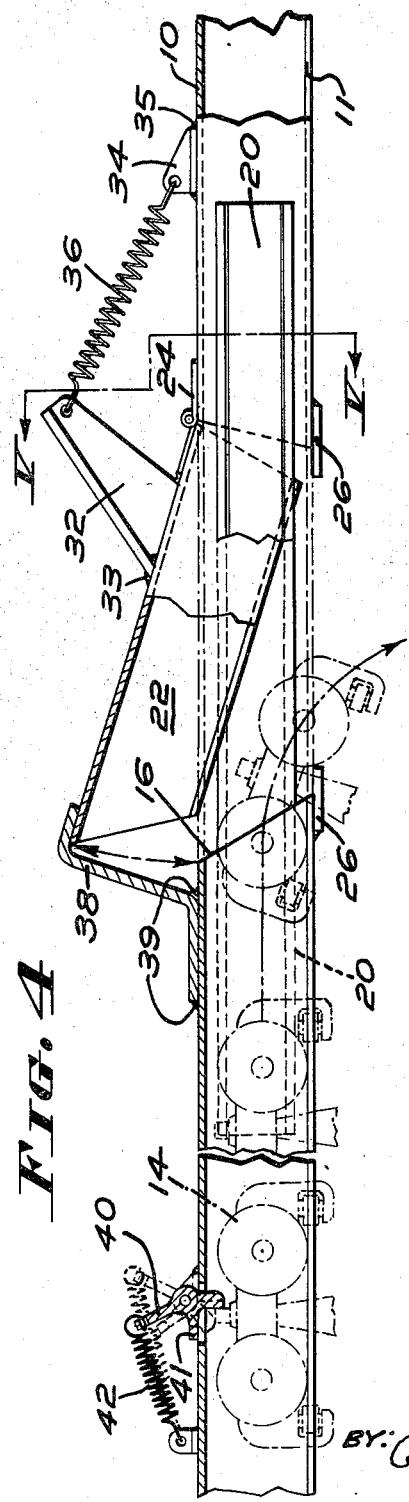
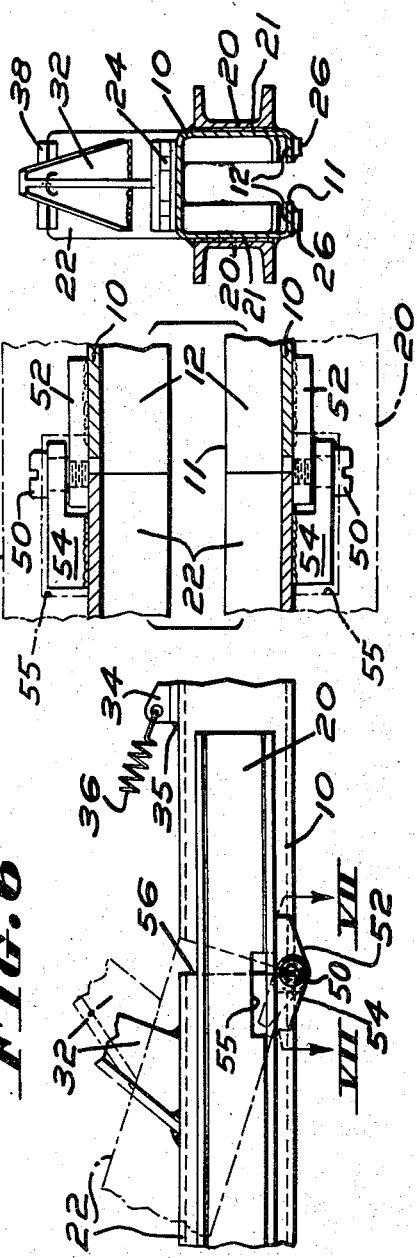
INVENTORS:
KENNETH D. SCHREYER
and ALLAN E. ELDRIDGE
BY Beau, Brooks, Buckley & Beau,
ATTORNEYS.

United States Patent Office 2,945,452
Patented July 19, 1960

2,945,452

CONVEYOR TROLLEY TRACKWAY

Kenneth D. Schreyer, Williamsville, and Allan E. Eldridge, Eggertsville, N.Y., assignors to Columbus McKinnon Chain Corporation, Tonawanda, N.Y.

Filed Mar. 20, 1959, Ser. No. 800,705

7 Claims. (Cl. 104—108)

This invention relates to continuous track conveyor systems, and more particularly to a trolley insert or removal port for closed-sectioned conveyor tracks.

One object of the invention is to provide an improved access port as aforesaid for box-sectioned slotted trackways which will permit ready withdrawal from or addition to the track system of load carrying or driving trolleys or the like.

Another object of the invention is to provide an improved access port as aforesaid which is easily operated manually, and which when in its closed position constitutes a rigid and continuous part of the trackway system.

Another object is to provide a device as aforesaid which is operable automatically to move between its open and closed positions.

Another object of the invention is to provide a device as aforesaid which is simple and rugged in structure, and easily and inexpensively fabricated.

Other objects and advantages of the invention will appear from the detailed description hereinbelow and the accompanying drawings wherein:

Fig. 1 is a side elevational view of a segment of conveyor track incorporating a manually operable access port of the invention;

Fig. 2 is a top plan view corresponding to Fig. 1;

Fig. 3 is an end view of the device of Figs. 1, 2;

Fig. 4 is a side elevational view of a spring-operated form of the invention;

Fig. 5 is a sectional view taken on line V—V of Fig. 4;

Fig. 6 is a fragmentary side elevational view corresponding to a portion of Fig. 4 but illustrating a modified form of hinge arrangement for the gate section of the device of the invention; and Fig. 7 is a fragmentary, top plan view taken on line VII—VII of Fig. 6.

As shown in the drawings, the conveyor system utilizes a box-sectioned trolley trackway 10 which is slotted as at 11 to accommodate trolley hangers, thus providing opposed rail portions 12—12 on which the wheeled trolleys 14 run. Wherever access ports are required in the track system the trackway 10 is provided with an opening gap 16 which is trapezoidal shaped in side view. The unity as well as the rigidity of the trackway system is maintained by provision of splice plates 20—20 which are preferably of channel-sectioned form and welded to opposite sides of the trackway 10 so as to span the gap 16 therein. A track gate portion 22 which is also box-sectioned and shaped to complement the opening 16 in the trackway is hinged to the trackway at 24. A pair of stop bars 26, 26 are welded to the bottoms of each of the rail portions 12—12 to extend into the opening 16 and thereby provide seats for the gate section 22 when in its down or closed position. Spacing plates 21 may be welded between the splice plates 20 and stationary portion of the trackway 10 at opposite ends of the gap 16 to provide side clearance for the operating gate section.

In the embodiment of the invention shown in Figs. 1–3, a handle member 28 is welded as indicated at 29 to the top wall of the gate portion 22, and a handle stop bar 30 is welded at one end thereof to a leg of one of the splice plates 20 as indicated at 31. Thus, whereas the gate section 22 normally resides in its closed solid line position as shown in Fig. 1, manual operation of the handle 28 will cause the gate section 22 to pivot upwardly into its open position as shown in phantom in Fig. 1. The handle stop bar 30 thereupon stops the handle 28 and retains the gate section in the open position shown, whereupon trolleys may easily be inserted or removed from the trackway as desired. Upon return of the gate section to "closed" position an integral endless track system is reestablished. When inserting trolleys into the system it is not actually necessary to operate the handle as aforesaid because simply pushing upward against the gate section will cause it to be displaced against the gravity forces thereon so as to permit sliding of the trolley into the trackway.

A modification of the device of the invention is shown in Figs. 4 and 5 wherein the gate section 22 of the trackway is arranged to normally remain in open position, but automatically closes during passage of a trolley from right to left which is the running direction of the trolley system as shown in Fig. 4. In this modified form, a bracket 32 is welded to the gate section as indicated at 33, and a bracket 34 is welded to the stationary portion of the trackway as indicated at 35, and a tension spring 36 is connected therebetween. Thus, the spring 36 will normally maintain the gate section 22 in open position when in unloaded condition. A stop bracket 38 is welded to the fixed track section opposite to the hinge 24 as indicated at 39. With this arrangement trolleys may be unloaded from the trackway system by moving them from left to right as desired without the need of first operating the gate section manually. However, normal operation and travel of the trolleys from right to left will result in the gate section being depressed under the weight of each trolley, thereby closing the track sections while the trolleys travel through the gate portion. This arrangement is particularly useful in systems where numerous additions and subtractions of trolleys are necessary.

In order to prevent inadvertent loss of trolleys through the open gate section, as by accidental rolling backward therethrough, an automatic stop is provided. This comprises a pivoted lever 40 mounted atop the trackway 10 and having its upper end attached to a tension spring 42 and its lower end extending through a slot in the top of the trackway; the lower end of the lever being so located as to engage the trolleys passing thereunder. The lever includes a horizontally offset stop portion 41 which extends forwardly therefrom and is laterally offset so as to engage the top wall of the trackway 10. Thus, the stop portion 41 prevents the lever from rotating counter-clockwise as viewed in Fig. 4 and the lever is therefore normally a positive stop against any trolley movement from left to right. On the other hand, trolleys moving from right to left will cam the lever 40 to pivot against the force of the spring 42, thus allowing the trolleys to pass thereunder in the direction of the conveyor operation. If it is desired to remove a trolley which has passed the stop lever 40, the stop lever may be manually pivoted in clockwise direction whereupon the trolley may be moved thereunder and then out of the gate opening.

Figs. 6 and 7 illustrate a variation in the hinge arrangement for the gate section 22, wherein a hinge 50 is located at the lower juncture of the gate section 22 and one end of the fixed portion of the trackway. In this hinge arrangement, the hinge pintles interconnect brackets 52 which may be welded to the track 10, and brackets 54 which are welded to the gate section 22. At this point the splice plates 20—20 are provided with slotted portions 55, 55 to allow passage of the brackets 54 therethrough when the gate section is pivoted upwardly. When this bottom mounted hinge arrangement is used, the gate section 22 will have its hinged end cut back as indicated at 56 to allow for the upward pivoting thereof. Thus, in this variation V-shaped openings will exist in the trackway side walls when the gate is in the "closed" position, but a smoother junction between the gate section and the trackway at their track surfaces will result, and thus this form may be preferred such as in the case when trolleys utilizing small diameter guide wheels are being used.

Thus, it may be seen that a simple and inexpensively fabricated, yet rugged access port is provided; and it will be understood that although only a few forms of the device of the invention have been illustrated and described herein, it will be understood that various changes may be made therein without departing from the spirit of the invention or the scope of the following claims.

We claim:

1. A conveyor trolley trackway including a substantially closed-sectioned rail having opposed side, top, and bottom wall portions adapted to accommodate interiorly thereof a travelling trolley device, said rail being interrupted to provide an access opening to the interior thereof, splice plates spanning said opening and interconnecting corresponding side wall portions of said rail, a gate device of sectional form similar to that of said rail and longitudinally formed to complement said opening, a hinge device interconnecting one end of said gate and said trackway at one end of said opening, means limiting downward and upward pivoting movements of said gate between open and closed positions, and crank arm means extending from the top wall portion of said gate device and controllable to move said gate device between open and closed positions.

2. A conveyor trolley trackway including a substantially closed-sectioned rail having opposed side, and top and bottom wall portions, adapted to accommodate interiorly thereof a travelling trolley device, said rail being interrupted to provide an access opening to the interior thereof, splice plates spanning said opening and interconnecting corresponding side wall portions of said rail, a gate device of sectional form similar to that of said rail and longitudinally formed to complement said opening, a hinge device interconnecting one end of said gate and said trackway at one end of said opening, means limiting downward and upward pivoting movement of said gate between open and closed positions, and spring means biasing said gate to its open position, said gate and spring means being so arranged that passage of trolley devices, in one direction of travel will cam said gate to assume its closed position.

3. A conveyor trolley trackway including a substantially closed sectioned rail having opposed side, and top and bottom wall portions adapted to accommodate interiorly thereof a traveling trolley device, said rail being interrupted to provide an access opening to the interior thereof, a gate device of sectional form similar to that of said rail and longitudinally formed to complement said opening, a hinge device interconnecting one end of said gate and said trackway at one end of said opening, means limiting downward pivoting movement of said gate to trackway closed position, crank arm means extending from said gate device and controllable to move said gate between closed position and an open position wherein the center of gravity of said gate is disposed off-center of said hinge device whereby the weight of said gate tends to hold it in open position.

4. A conveyor trolley trackway including a substantially closed sectioned rail having opposed side, and top and bottom wall portions adapted to accommodate interiorly thereof a traveling trolley device, said rail being interrupted to provide an access opening to the interior thereof, a gate device of sectional form similar to that of said rail and longitudinally formed to complement said opening, a hinge device interconnecting one end of said gate and said trackway at one end of said opening, means limiting downward pivoting movement of said gate to trackway closed position, crank arm means extending from said gate device and controllable to move said gate between closed position and an open position wherein the center of gravity of said gate is disposed off-center of said hinge device whereby the weight of said gate tends to hold it in open position and stop means cooperating with said crank arm to limit the trackway opening movements of said gate device.

5. A conveyor trolley trackway including a substantially closed-sectioned rail having opposed side, and top and bottom wall portions adapted to accommodate interiorly thereof a traveling trolley device, said rail being interrupted to provide an access opening to the interior thereof, splice plates spanning said opening and interconnecting corresponding side wall portions of said rail, a gate device of sectional form similar to that of said rail and longitudinally formed to complement said opening, a hinge device interconnecting one end of said gate and said trackway at one end of said opening, means limiting downward and upward pivoting movement of said gate between open and closed positions, and spring means biasing said gate to its open position, said gate and spring means being so arranged that passage of trolley devices in one direction of travel will cam said gate to assume its closed position, and a trolley reverse motion check device disposed in said trackway adjacent said opening to prevent unintended escape of trolleys from said trackway.

6. A conveyor trolley trackway including a substantially closed sectioned rail having opposed side, and top and bottom wall portions adapted to accommodate interiorly thereof a traveling trolley device, said rail being interrupted to provide an access opening to the interior thereof, means spanning said opening and interconnecting corresponding wall portions of said rail, a gate device of sectional form similar to that of said rail and longitudinally formed to complement said opening, a hinge device interconnecting one end of the top wall of said gate and said trackway at one end of said opening, means limiting downward and upward pivoting movement of said gate between open and closed positions, and crank arm means extending from said gate device and controllable to move said gate device between open and closed positions.

7. A conveyor trolley trackway including a substantially closed sectioned rail having opposed side, and top and bottom wall portions adapted to accommodate interiorly thereof a traveling trolley device, said rail being interrupted to provide an access opening to the interior thereof, means spanning said opening and interconnecting corresponding wall portions of said rail, a gate device of sectional form similar to that of said rail, hinge devices interconnecting one end of the bottom wall of said gate and said trackway at one end of said opening, means limiting downward and upward pivoting movement of said gate between open and closed positions, and spring means biasing said gate to its open position, said gate and spring means being so arranged that passage of trolley devices in one direction of travel will cam said gate to assume its closed position, and a trolley reverse motion check device disposed in said trackwey adjacent said opening to prevent unintended escape of trolleys from said trackway.

References Cited in the file of this patent

UNITED STATES PATENTS

| | | |
|---|---|---|
| 2,014,729 | Frank et al. | Sept. 17, 1935 |
| 2,026,884 | Glasgow | Jan. 7, 1936 |
| 2,117,480 | Harvey | May 17, 1938 |
| 2,128,135 | Glasgow | Aug. 23, 1938 |
| 2,148,237 | Kingdon | Feb. 21, 1939 |
| 2,361,882 | Smith | Oct. 31, 1944 |
| 2,499,060 | Goldberg | Feb. 28, 1950 |